Jan. 22, 1957 M. C. BURK 2,778,945
ELECTRICAL MEASURING APPARATUS
Filed May 24, 1954 2 Sheets-Sheet 1
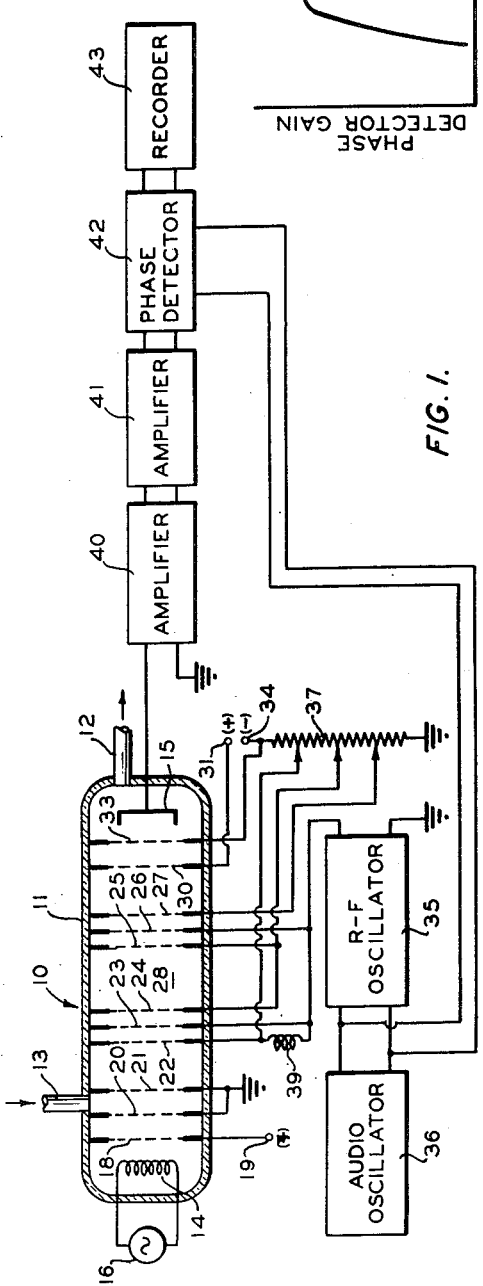
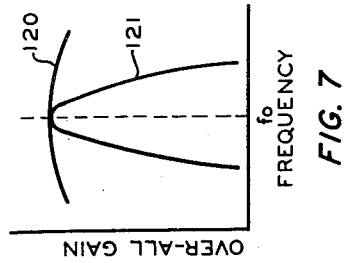
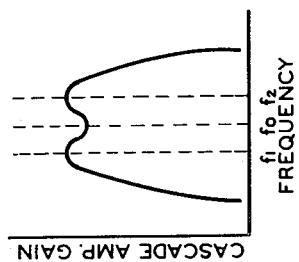
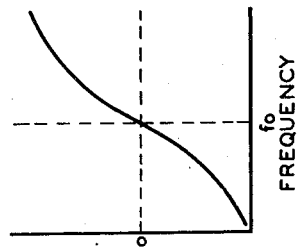
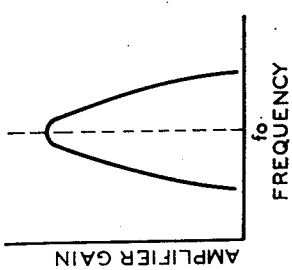
INVENTOR.
M. C. BURK
BY Hudson & Young
ATTORNEYS INVENTOR.
M. C. BURK
BY Hudson & Young
ATTORNEYS

2,778,945

ELECTRICAL MEASURING APPARATUS

Marvin C. Burk, Bartlesville, Okla., assignor to Phillips Petroleum Company, a corporation of Delaware Application May 24, 1954, Serial No. 431,805

11 Claims. (Cl. 250—41.9)

This invention relates to apparatus for measuring electrical signals. In another aspect it relates to a band pass frequency selective amplifier. In still another aspect it relates to ion detecting means for use with a mass spectrometer.

A mass spectrometer has recently been developed in which ions are passed through a plurality of spaced grids having electrical potentials applied therebetween such that ions of predetermined mass receive sufficient energy to penetrate a potential barrier to impinge upon a collector plate. In one embodiment of this spectrometer, the accelerating potentials applied between the spaced grids are obtained from an oscillator having a first frequency, the envelope of which is amplitude modulated by the output of a second oscillator having a second lower frequency. These alternating accelerating potentials being applied to the spaced grids result in velocity modulation of the ion stream at the frequency of the second oscillator. The amplitude of this frequency component of the ion stream is measured to provide an indication of the ions of predetermined mass which impinge upon the collector plate. Although this alternating component of the ion stream can be detected more accurately than the total ion current, the magnitude of this component is extremely small and must be amplified before being of sufficient strength to energize indicating or recording instruments.

In accordance with the present invention there is provided an improved detecting circuit which is particularly adapted for use in measuring the output signal of a mass spectrometer of the type described. The current resulting from ions impinging upon the collector plate is amplified by a pair of cascade connected amplifiers which are tuned to respective frequencies below and above the frequency of the component of the ion stream being detected. The resulting amplified signal is applied to a phase detector which also is energized by the oscillator which modulates the oscillator providing the accelerating potentials. The output signal from the phase detector is applied to a conventional recorder.

Accordingly, it is an object of this invention to provide improved apparatus for measuring alternating electrical signals.

Another object is to provide a band pass frequency selective amplifier.

Another object is to provide measuring apparatus employing a phase detector having one input supplied by a pair of cascade connected amplifiers which are tuned to respective frequencies below and above the frequency being detected.

A further object is to provide improved ion current detecting means for use with a mass spectrometer.

Various other objects, advantages and features of this invention should become apparent from the following detailed description taken in conjunction with the accompanying drawing in which:

Figure 1 is a schematic representation of a mass spectrometer tube having the detecting circuit of the present invention connected thereto;

Figures 3, 4, 5, 6 and 7 are graphical representations of the operation of the detecting circuit of this invention.

Figure 2:
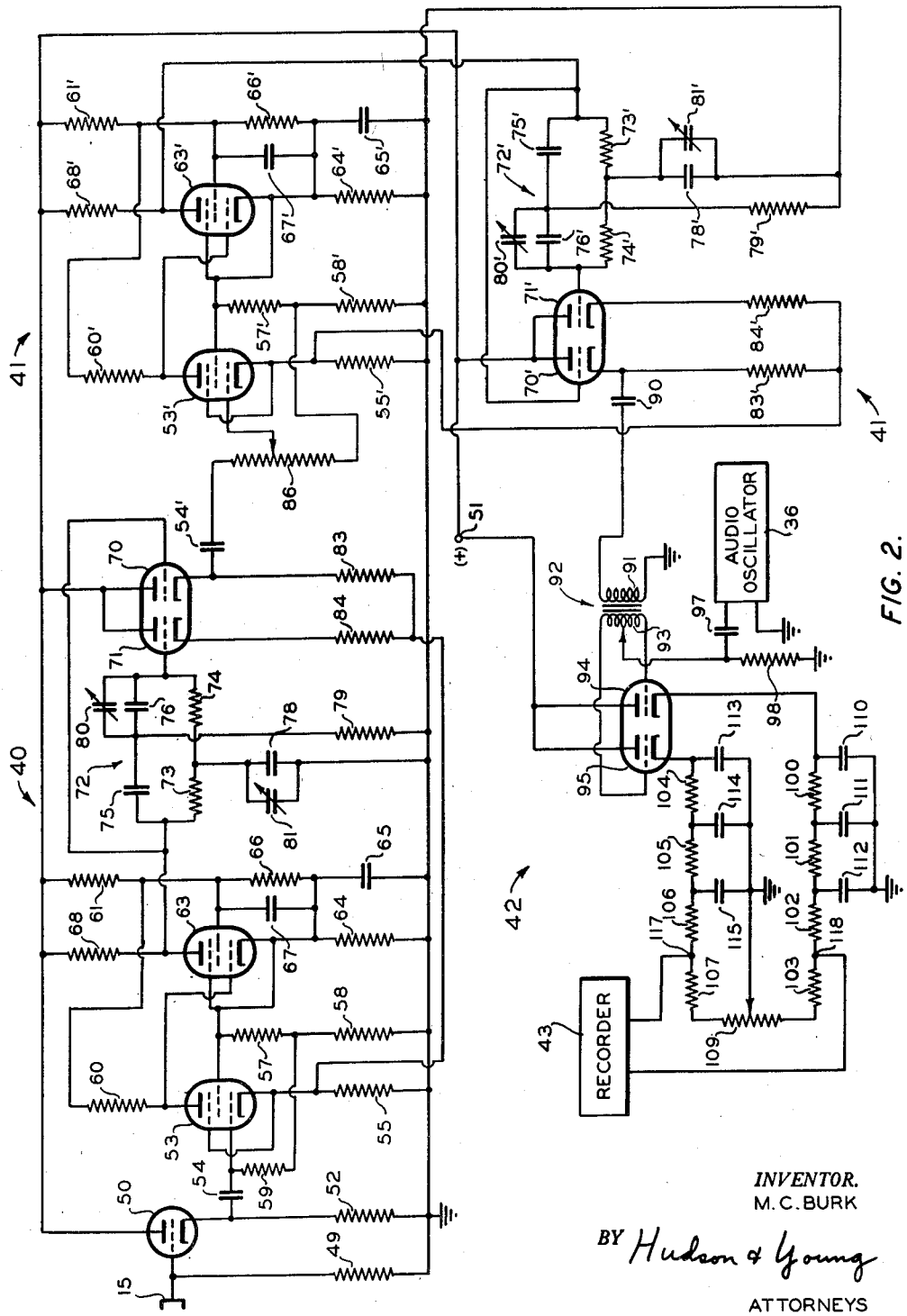
Figure 2 is a schematic circuit diagram of the amplifiers and phase detector of Figure 1.

Referring now to the drawing in detail and to Figure 1 in particular, there is shown a mass spectrometer tube 10 which comprises a gas impermeable envelope 11, the interior of which is maintained at a reduced pressure by a vacuum pump, not shown, which communicates with tube 10 through a conduit 12. A gas sample to be analyzed is introduced into tube 10 through a conduit 13. An electron emitting filament 14 is disposed at one end of tube 10 and an ion collector plate 15 is disposed at the opposite end. Filament 14 is heated by a source of electrical energy 16. A first electron permeable grid 18 is disposed adjacent filament 14 and connected to a terminal 19 which is maintained at a potential more positive than filament 14. A pair of spaced grids 20 and 21 is disposed adjacent conduit 13 to form an ionization chamber. Electrons emitted from filament 14 are accelerated by grid 18 into the region between grids 20 and 21 to bombard the gas molecules introduced through conduit 13, thereby forming the ions to be detected. A first group of three equally spaced electrodes 22, 23 and 24 is spaced from grid 21, and a second group of three equally spaced electrodes 25, 26 and 27 is spaced from grid 24. The two groups of grids are separated by a field-free drift space 28. A grid 30, which is connected to a terminal 31 that is maintained at a positive potential, is spaced from grid 27. A grid 33 is positioned between grid 30 and collector plate 15, grid 33 being connected to a terminal 34 which is maintained at a negative potential.

Grids 23 and 26 are connected to the first output terminal of an oscillator 35 which provides an electrical signal of radio frequency, for example. The envelope of the output signal from oscillator 35 is modulated by the output of a second oscillator 36 which provides a lower frequency in the audio range, for example. A potential dividing resistor 37 is connected between terminal 34 and ground. Grid 22 is connected to a first point on resistor 37; grids 24 and 25 are connected to a second point on resistor 37 which is less negative than the first point; and grid 27 is connected to a third point on resistor 37 which is less negative than the second point. Grids 22 and 23 are connected by a coil 39.

The ions formed between grids 20 and 21 are accelerated by the negative potential applied to grid 22 into the region between grids 22 and 23. Those ions of predetermined mass which enter this region at the proper time, with respect to the phase of the alternating potential applied between these grids, are accelerated to receive maximum energy and pass into the region between grids 23 and 24. At this time, the alternating signal applied between grids 23 and 24 is of reversed polarity so that the ions are again accelerated. The ions then pass through drift space 28 and are again accelerated by the potentials applied between grids 25 and 26 and grids 26 and 27. The ions which receive maximum energy are able to penetrate the positive potential barrier imposed at grid 30 and impinge upon collector plate 15. The ions which do not receive this maximum energy are repelled by grid 30. Grid 33 is maintained at a negative potential to suppress secondary electrons which may be emitted within the tube by the ions impinging elements of the tube.

The output signal of tube 10, resulting from the ions impinging upon collector plate 15, has a component of the frequency of oscillator 36. It is this component of the ion current that is measured in accordance with the present invention. Collector plate 15 is connected to the input of a first amplifier 40 which is tuned to a frequency slightly lower than the frequency of oscillator 36. The output of amplifier 40 is connected to the input of a second amplifier 41 which is tuned to a frequency slightly greater than the frequency of oscillator 36. The output of amplifier 41 is compared with an output signal from oscillator 36 by a phase detector 42. The output signal of phase detector 42 is applied to a recorder 43.

The detector circuit is illustrated in detail in Figure 2. Collector plate 15 of tube 10 is connected directly to the control grid of a triode 50. The anode of triode 50 is connected to a terminal 51 which is maintained at a positive potential. The cathode of triode 50 is connected to ground through a resistor 52 and to the control grid of a pentode 53 through a capacitor 54. The suppressor grid of pentode 53 is connected to the cathode thereof, which in turn is connected to ground through a resistor 55. The screen grid of pentode 53 is connected to ground through a pair of series connected resistors 57 and 58. The control grid of pentode 53 is connected to the junction between resistors 57 and 58 through a resistor 59. The anode of pentode 53 is connected to terminal 51 through a pair of series connected resistors 60 and 61 and is connected directly to the control grid of a second pentode 63. The suppressor grid of pentode 63 is connected to the cathode thereof, which in turn is connected to ground through a resistor 64, the latter being shunted by a capacitor 65. The screen grid of pentode 63 is connected to terminal 51 through resistor 61 and to ground through a resistor 66 which is connected in series with capacitor 65. A capacitor 67 is connected in shunt with resistor 66. The anode of pentode 63 is connected to terminal 51 through a resistor 68. The anode of pentode 63 is connected directly to the control grid of a first triode 70 and to the control grid of a second triode 71 through a parallel-T filter 72.

Filter 72 comprises a pair of series connected resistors 73 and 74 which is connected in parallel with a pair of series connected capacitors 75 and 76. The junction between resistors 73 and 74 is connected to ground through a capacitor 78, and the junction between capacitors 75 and 76 is connected to ground through a resistor 79. A variable capacitor 80 is connected in shunt with capacitor 76, and a variable capacitor 81 is connected in shunt with capacitor 78. The anodes of triodes 70 and 71 are connected to terminal 51. The cathode of triode 71 is connected to the cathode of pentode 53 through a resistor 84, and the cathode of triode 71 is connected to the cathode of pentode 53 through a resistor 83.

The circuit thus far described in Figure 2 constitutes amplifier 40 of Figure 1. This amplifier is particularly adapted to amplify a narrow frequency band in the audio range. The input signal is applied through cathode follower 50 to amplifier tube 53, the output of which is applied to amplifier tube 63. The output of amplifier tube 63 is applied to the cathode follower output tube 70. Two separate feedback loops connect the anode of pentode 63 to the cathode of pentode 53. The first of these loops is through filter 72 and cathode follower 71. The second of these loops is through cathode follower 70. Direct coupling is employed to minimize phase shift at the low frequency. In one embodiment of this invention, oscillator 36 had an output frequency of approximately 25.5 cycles per second. Amplifier 40 was tuned to 21.9 cycles per second and amplifier 41 was tuned to 29.1 cycles per second. The circuit components of amplifier 40 were as follows: resistors 60 and 68, 180,000 ohms each; resistor 59, 1 megohm; resistor 55, 2,000 ohms; resistor 57, 68,000 ohms; resistor 58, 12,000 ohms; resistor 61, 66 and 64, 22,000 ohms each; resistor 83, 300,000 ohms; resistor 84, 15,000 ohms; resistors 73 and 74, 680,000 ohms each; resistor 79, 330,000 ohms; capacitor 54, 0.2 microfarad; capacitors 65 and 67, 150 microfarads each; capacitors 75 and 76, 0.01 microfarad each; capacitor 78, 0.02 microfarad; pentodes 53 and 63, tube type 6AU6; triodes 70, 71, tube type 12AU7; and potential terminal 51, 300 volts. Sufficient capacitance was added by capacitors 80 and 81 to tune filter 72 to the desired frequency.

The cathode of triode 70 is connected to one terminal of a capacitor 54', the second terminal of which is connected to one end terminal of a potentiometer 86. The contactor of potentiometer 86 is connected to the control grid of a pentode 53'. Amplifier 41 is generally similar to amplifier 40 and corresponding primed reference numerals are employed to designate like elements. The second terminal of potentiometer 86 is connected to the junction between resistors 57' and 58'. In the above-mentioned embodiment of this invention, the circuit components were identical to corresponding components of amplier 40 with the exception of filter 72' which had the following circuit values: capacitors 75' and 76', 0.01 microfarad each; capacitor 78', 0.02 microfarad; resistors 73' and 74', 538,000 ohms each; and resistor 79', 270,000 ohms. Potentiometer 86 had a resistance of one megohm.

The cathode of triode 70' is connected through a capacitor 90 to one end terminal of the primary winding 91 of a transformer 92 which forms the input of phase detector 42. The second end terminal of transformer winding 91 is connected to ground. The end terminals of the secondary winding 93 of transformer 92 are connected to the respective control grids of a pair of triodes 94 and 95. One output terminal of oscillator 36 is connected through a capacitor 97 to the center tap of transformer winding 93. This center tap is also connected to ground through a resistor 98. The second output terminal of oscillator 36 is connected to ground. The anodes of triodes 94 and 95 are connected to terminal 51. The cathode of triode 94 is connected to one terminal of a resistor 100 which is connected in series with resistors 101, 102 and 103. The cathode of triode 95 is connected to one terminal of a resistor 104 which is connected in series with resistors 105, 106 and 107. The end terminals of resistors 103 and 107 are connected to respective end terminals of a potentiometer 109, the center tap of which is grounded. A capacitor 110 is connected between ground and the cathode of triode 93, a capacitor 111 is connected between ground and the junction between resistors 100 and 101, and a capacitor 112 is connected between ground and the junction between resistors 101 and 102. A capacitor 113 is connected between ground and the cathode of triode 95, a capacitor 114 is connected between ground and the junction between resistors 104 and 105, and a capacitor 115 is connected between ground and the junction between resistors 105 and 106. The junction 117 between resistors 106 and 107 is connected to one input terminal of recorder 43, and the junction 118 between resistors 102 and 103 is connected to the second input terminal of recorder 43.

The currents flowing through triodes 94 and 95 are functions of the signals applied to the respective control grids. Because of the filter circuits connected to the two cathodes, the potentials at terminals 117 and 118 represent the average currents flowing through the two triodes. In the above-mentioned embodiment of his invention, the circuit components of the detector circuit were as follows: resistors 100, 101, 102, 104, 105 and 106, 33,000 ohms each; resistors 103 and 107, 100 ohms each; potentiometer 109, 10 ohms; capacitors 110, 111, 112, 113, 114 and 115, 10 microfarads each.

The operation of the measuring apparatus of this invention can be explained in conjunction with Figures 3, 4, 5, 6 and 7. Phase detector 42 is both amplitude and phase sensitive. The voltage applied to the center tap of transformer winding 93 is in phase with the signal applied to transformer winding 91 if the amplifiers are properly tuned. Since the frequency of oscillator 36 is rather low, 25.5 cycles per second, for example, the time of flight of the ions through tube 10 is negligible in comparison with the period of the output signal from oscillator 36. Thus, if no phase shift takes place through amplifiers 40 and 41, the two signals compared by detector 42 are in phase such that the signal applied to recorder 43 is representative of only the amplitude of the ion current. By means of the feedback networks 72 and 72', amplifiers 40 and 41 are selectively tuned to respective frequencies below and above the frequency of oscillator 36. If desired, the frequencies to which the two amplifiers are tuned can be reversed. If only a single amplifier were employed, and if this amplifier were tuned to the frequency of the output signal of oscillator 36, then the gain of such an amplifier would vary with frequency somewhat as shown in Figure 3 where $f_0$ is the frequency of oscillator 36. Such a system would be permissible if the frequency of oscillator 36 could be held absolutely constant at $f_0$. However, in practice the frequency of oscillator 36 may vary as much as one percent, and the gain of a single sharply tuned amplifier falls off rapidly at either side of the resonant frequency.

In Figure 4, there is shown the relationship between the phase of the output signal of a tuned amplifier and the frequency of the input signal. Such an amplifier is tuned at the frequency $f_0$. If the frequency of the input signal varies in either direction from $f_0$, then the phase of the output signal is shifted rapidly. In Figure 5 there is shown the relationship between the gain of phase detector 42 and the phase of the two signals being compared. If the phase of the output signal from amplifier 41 is shifted, the gain of phase detector 42 falls off rapidly.

In order to overcome these difficulties, amplifiers 40 and 41 are connected in cascade relationship and stagger-tuned. Amplifier 40 is tuned to have a maximum gain at a frequency $f_1$ (21.9 cycles per second) and amplifier 41 is tuned to have a maximum gain at a frequency $f_2$ (29.1 cycles per second). Frequency $f_1$ preferably is as much below frequency $f_0$ (25.5 cycles per second) as frequency $f_2$ is above frequency $f_0$. The composite gain of the two amplifiers as a function of frequency is illustrated in Figure 6. It can be seen that the resulting curve has a peak on either side of frequency $f_0$. In Figure 7, curve 120 represents the over-all gain of amplifiers 40 and 41 and phase detector 42 as a function of frequency. Curve 120 is essentially the curves of Figures 5 and 6 superimposed. At frequency $f_0$, the gain of phase detector 42 is a maximum whereas this gain falls off rapidly both below and above frequency $f_0$. However, the cascade connected amplifier gain increases as the frequency increases or decreases from frequency $f_0$. The net result is a curve 120 that is substantially flat. Curve 121 in Figure 7 represents the over-all gain which would be provided using a single amplifier tuned to frequency $f_0$. It should thus be apparent that the arrangement of the cascade connected amplifiers and the phase detector results in a system wherein the over-all gain is substantially independent of frequency over a preselected range.

While the measuring apparatus of this invention has been described in conjunction with a mass spectrometer, it should be apparent that the apparatus is useful for the measurement of any alternating signal by comparing the signal with a reference alternating signal. An example of such use is the measurement of unbalance of a bridge circuit by comparing the unbalance signal with the bridge excitation voltage. While this invention has been described in conjunction with a present preferred embodiment, it should be apparent that the invention is not limited thereto.

What is claimed is:

1. Apparatus to measure an alternating electrical signal comprising, in combination, a first amplifier, the signal to be measured to be applied to the input terminals of said first amplifier, a second amplifier, the output terminals of said first amplifier being connected to the input terminals of said second amplifier, one of said amplifiers being tuned to have a maximum gain at a frequency less than the frequency of the signal to be measured, the other of said amplifiers being tuned to have a maximum gain at a frequency greater than the frequency of the signal to be measured, a phase sensitive detector adapted to compare two signals, means connecting the output terminals of said second amplifier to a first set of input terminals of said detector, means to apply a second electrical signal of the same frequency as the frequency of the signal to be measured to the second set of input terminals of said detector, and means to measure the output of said detector.

2. The combination in accordance with claim 1 wherein said amplifiers are tuned to have maximum gain at frequencies below and above the frequency of the signal to be measured by equal amounts, respectively.

3. The combination in accordance with claim 1 wherein both of said signals are derived from a common voltage source.

4. The combination in accordance with claim 1 wherein said phase sensitive detector comprises first and second electron tubes each having an anode, a cathode and a control grid, a transformer, means to apply the output of said second amplifier to the primary winding of said transformer, means to apply said second signal between the center tap of the secondary winding of said transformer and a point of reference potential, means connecting the end terminals of the secondary winding of said transformer to the control grids of said tubes, respectively, and means to measure the current flows through said two tubes.

5. The combination in accordance with claim 4 wherein said means to measure the current flows through said two tubes comprises a plurality of first series-connected resistors, a plurality of second series-connected resistors, first end terminals of said pluralities of resistors being connected to said cathodes, respectively, a potentiometer, the second end terminals of said pluralities of resistors being connected to respective end terminals of said potentiometer, the contactor of said potentiometer being connected to a point of reference potential, a plurality of capacitors connected between said point of reference potential and the respective junctions between adjacent ones of said resistors, and means to compare the current flows through said first and second pluralities of resistors.

6. The combination in accordance with claim 1 wherein each of said amplifiers comprises a multi-stage vacuum tube amplifier having a tuned degenerative feedback network therein, the feedback networks of said amplifiers being tuned to said frequencies below and above the frequency of the signal to be measured, respectively.

7. The combination in accordance with claim 6 wherein said feedback networks comprise parallel-T filters.

8. Electrical measuring apparatus comprising, in combination, a source of voltage of a predetermined frequency, means to vary the amplitude of a first signal from said source in accordance with a quantity to be measured, a first amplifier, means to apply said first signal to the input terminals of said first amplifier, a second amplifier, the output terminals of said first amplifier being connected to the input terminals of said second amplifier, one of said amplifiers being tuned to have a maximum gain at a frequency less than said predetermined frequency, the other of said amplifiers being tuned to have a maximum gain at a frequency greater than said predetermined frequency, a phase sensitive detector adapted to compare two signals, means connecting the output terminals of said second amplifier to one set of input terminals of said detector, means to apply a second signal from said source to the second set of input terminals of said detector, and means to measure the output of said detector.

9. In a mass spectrometer including an ion source, a collector plate, and a plurality of accelerating grids disposed between said source and said plate; means to measure ions of a predetermined mass comprising a source of voltage of a predetermined frequency, means to apply said voltage to said accelerating grids, a first amplifier, means to connect said collector plate to the input of said first amplifier, a second amplifier, the output terminals of said first amplifier being connected to the input terminals of said second amplifier, one of said amplifiers being tuned to have a maximum gain at a frequency less than said predetermined frequency, the other of said amplifiers being tuned to have a maximum gain at a frequency greater than said predetermined frequency, a phase sensitive detector adapted to compare two signals, means connecting the output terminals of said second amplifier to one set of input terminals of said detector, means to apply a second signal from said source to the second set of input terminals of said detector, and means to measure the output of said detector.

10. The combination in accordance with claim 9 wherein said means to connect said collector plate to the input of said first amplifier comprises an electron tube having a cathode, an anode and a control grid, said collector plate being connected to said control grid, and an output lead connected to said cathode.

11. The combination in accordance with claim 9 wherein said means to apply said voltage to said accelerating grids comprises a second source of voltage of frequency higher than the frequency of said first-mentioned source, means to amplitude modulate the output signal of said second source by the output signal of said first source, and means to apply the resulting modulated voltage to said accelerating grids.

No references cited.